United States Patent [19]
Heyde

[11] Patent Number: 6,152,019
[45] Date of Patent: Nov. 28, 2000

[54] APPARATUS FOR CONTINUOUSLY TEMPERING CHOCOLATE MASSES AND THE LIKE

[75] Inventor: Hans Heyde, Wallenhorst, Germany

[73] Assignee: Sollich GmbH & Co KG, Bad Salzuflen, Germany

[21] Appl. No.: 09/327,804

[22] Filed: Jun. 8, 1999

[30] Foreign Application Priority Data

Nov. 24, 1998 [DE] Germany ............................ 198 54 204

[51] Int. Cl.$^7$ .............................. A23C 3/04; B01F 15/06
[52] U.S. Cl. .............................. 99/348; 99/455; 366/144; 366/315
[58] Field of Search ................... 366/316, 315, 366/317, 144, 145, 147, 148, 149; 99/453, 348, 326, 327, 455; 426/660, 520, 524

[56] References Cited

U.S. PATENT DOCUMENTS

| | | | |
|---|---|---|---|
| 1,375,210 | 4/1921 | Clayton et al. | 165/94 |
| 2,677,942 | 5/1954 | Schott et al. | 366/144 |
| 3,770,252 | 11/1973 | Gordini et al. | 366/147 |
| 4,059,047 | 11/1977 | Sollich | 99/455 |
| 4,648,315 | 3/1987 | Blum | 99/455 |
| 4,859,483 | 8/1989 | Sollich | 426/519 |
| 4,892,033 | 1/1990 | Sollich | 99/455 |
| 5,032,418 | 7/1991 | Sollich | 426/520 |
| 5,514,390 | 5/1996 | Aasted | 99/348 |
| 5,525,364 | 6/1996 | Haslund | 99/348 |
| 5,850,782 | 12/1998 | Aasted | 366/144 |

FOREIGN PATENT DOCUMENTS

| | | |
|---|---|---|
| 0 289 849 | 4/1988 | European Pat. Off. . |
| 0 472 886 B1 | 7/1991 | European Pat. Off. . |
| 0 806 149 A2 | 5/1997 | European Pat. Off. . |
| 0 872 187 A1 | 8/1997 | European Pat. Off. . |
| WO 92/00015 | 6/1991 | WIPO . |

OTHER PUBLICATIONS

European Search Report, of EP99108832 Sep. 6, 1999.

*Primary Examiner*—Tony G. Soohoo
*Attorney, Agent, or Firm*—Thomas, Kayden, Horstemeyer & Risley

[57] ABSTRACT

An apparatus for continuously tempering chocolate masses and the like includes at least one tempering column (1) including a plurality of liquid chambers (17). The liquid chambers (17) include tempering surfaces (18), and they are interconnected for the flow of a tempering medium. A plurality of mass chambers (7) is arranged between the tempering surfaces (18) of the liquid chambers (17). The liquid chambers (17) and the mass chambers (7) form a cylinder. A plurality of mixing tools (6) is provided, each mixing tool (6) being arranged in one of the mass chambers (7), and each mixing tool (6) being connected to a driving shaft (3). A plurality of mass passages (26) is provided, each mass passage (26) interconnecting two adjacent mass chambers (7) for the flow of the mass to be tempered. Each of the mass passages (26) has the shape of an annular gap being connected to and surrounding the driving shaft (3). At least one temperature sensor (27) is arranged in one of the mass passages (26) having the shape of an annular gap being connected to and surrounding said driving shaft (3).

17 Claims, 4 Drawing Sheets

APPARATUS FOR CONTINUOUSLY TEMPERING CHOCOLATE MASSES AND THE LIKE

CROSS REFERENCE TO RELATED APPLICATIONS

This application claims the benefit of co-pending German patent application number 198 54 204.6 entitled "Vorrichtung zum kontinuierlichen Aufbereiten von zu verarbeitenden kakaobutterhaltigen oder ähnlichen fetthaltigen Massen", filed on Nov. 24, 1998.

FIELD OF THE INVENTION

The present invention generally relates to apparatuses for continuously tempering chocolate masses and the like. More particularly, the present invention relates to an apparatus for continuously tempering chocolate masses and the like including a tempering column and a temperature sensor being arranged inside a mass chamber through which the mass to be tempered flows.

BACKGROUND OF THE INVENTION

Apparatuses for continuously tempering chocolate masses and the like are known. The mass to be tempered is a chocolate mass or a similar mass including chocolates, white chocolates, cacao-containing and fat-containing masses.

Apparatuses for continuously tempering chocolate masses and the like are known from the European Patent Applications No. EP 0 289 849 A2 and EP 0 806 149 A2 and from the European Patent No. 0 472 886 B1. The apparatus includes a tempering column including a plurality of chambers being arranged one above the other and forming a cylinder. The chambers are partly connected to a cooling circuit for a cooling medium, and partly to a heating circuit for a heating medium. A mass chamber is formed between two adjacent liquid chambers, the mass chamber being limited by tempering surfaces. The mass to be tempered flows through the mass chambers. The tempering surfaces are formed by adjacent liquid chambers. Each mass chamber includes a driven stirring or mixing tool including a hub and a plurality of arms protruding in a radial direction with respect to the tempering column, the number of arms usually being in the order between 2 and 4. Each arm includes mixing blades being arranged at its top side and at its bottom side, the mixing blades serving to mix the mass. The mixing blades also fulfil the function of taking the mass off the tempering surfaces. This means that the mixing blades are arranged at the arms to overlap in a radial direction. The mixing blades may have an elongated shape. They may also have a convex or a concave design. On one side of the arms, the shape and the arrangement of the mixing blades is always identical, while on the other side of the arms, the design and the arrangement of the mixing blades is also identical, but opposite to the first side of the arms. The arms may additionally include openings to improve the mixing effect. Besides the taking-off effect, the mixing blades fulfil a mixing function. A substantial conveying motion of the mass through the apparatus and from one mass chamber to another mass chamber is attained by a mass pump pumping the liquid mass through the apparatus. Two adjacent mass chambers are interconnected by a mass passage. The mass passages are alternately arranged radially outside and radially inside with respect to the axis of the tempering column. Each mass passage being arranged radially outside includes a cylindrical bore having a circular cross section, the bore extending through the liquid chamber in an axial direction and being sealed with respect to the tempering medium. A temperature sensor is used to measure and to watch the temperature of the mass. The temperature sensor extends into a mass passage being arranged radially outside of the tempering column. This means that the mass passage is not arranged nearby the driving shaft, and it is not connected to the driving shaft. The temperature sensor is located at a place in which the temperature of the mass is changed upstream and downstream by two tempering surfaces being adjacent to a liquid chamber through which one single tempering mediums flows. The temperature of the mass is not correctly measured at the end of a zone, as this is especially desired for reasons of controlling, since the temperature still changes downstream to the end of the zone. The temperature measured by the temperature sensor may be representative for the actual temperature of the mass at the end of the zone, especially if the apparatus is operated at its nominal output or its calculated output. In case the apparatus operates at a reduced output or at reduced power, the streaming characteristics of the mass flowing through the mass passages being arranged radially outside change. Consequently, another insecurity occurs whether the temperature is representative for the partial load and for the end of the zone.

With respect to the objective of preferably measuring the exact temperature of the mass, it is disadvantageous that, due to the stirring arms including mixing blades, regions in which the mass elements are resident for different periods of time occur at different places of the mass chambers. This may be true upstream between the location of the temperature sensor and the end of the zone. Additionally, the mass particles first entering the apparatus do not necessarily also first exit the apparatus. There is the additional danger that, due to the design of the mixing arms, mass portions remain in a continuous circular movement inside the mass chamber between the mixing arms, and they do not participate in the flowing motion through the apparatus. Different temperatures of the mass may occur in such differently moving mass regions. Thus, an optimum growing of the crystals does not occur, and on the other hand, the temperature of the mass is not measured correctly.

Another apparatus for continuously tempering chocolate masses and the like is known from the European Patent Application No. EP 0 872 187 A1. The tempering column includes flat elements which are arranged one above the other. Usually, a liquid chamber through which a tempering medium flows and a mass chamber for the mass are alternately arranged. A heat stop in form of an insulating separating wall is located between two zones with mass chambers. The insulating separating wall is directly arranged between two mass chambers through which the mass flows, or between a mass chamber and a liquid chamber through which tempering medium flows. Thus, the usable surface of heat transmission is reduced. The mass passages are arranged on the outside alternately spaced apart at 180°. A temperature sensor for the mass extends into a mass passage being arranged radially outside, the mass passage interspersing the insulating separating wall with its circular cross section. Thus, the temperature sensor is advantageously arranged between two zones. In case of a partial load of the apparatus, the streaming or flowing characteristics of the mass change, these changes falsifying the measurement of the temperature.

Another apparatus for continuously tempering chocolate masses and the like is known from U.S. Pat. No. 4,648,315. The tempering column includes flat elements being located one above the other. A liquid chamber through which tempering medium flows and a mass chamber through which the mass flows are alternately arranged. The chambers are designed as disk-like hollow bodies. The liquid chambers are connected to tempering circuits. The mass chambers are interconnected by mass passages, the mass passing from one mass chamber into the adjacent mass chamber in the region of the inner circumference of a driving shaft extending with its axis through the tempering column. Thus, the mass passage between two adjacent mass chambers is arranged radially inside, and it has the shape of an annular gap surrounding the driving shaft. Two disk-like bodies are arranged in each mass chamber, the disk-like bodies being driven by the driving shaft. The two disk-like bodies each include openings for the passage of the mass from the bottom side of the first disk to the top side of the second disk. The openings are arranged at the outer circumference of the disks. The two disk-like bodies include spiral-like stripping ridges being arranged at the sides of the disk-like bodies being adjacent to the tempering surfaces of the adjacent chamber. The stripping ridges are designed to be longer than the radius of the disk, and they are arranged in such a sense of rotation to convey the mass. Two adjacent spiral-like stripping ridges form a continuous channel extending from the outside to the inside and from the inside to the outside, respectively. The mass is moved inside this channel without having the possibility of getting in contact with mass portions of other channels. The mass cannot flow from one channel to another channel. The stripping ridges take the mass off the tempering surfaces without getting in direct contact to the tempering surfaces. The two disk-like bodies include ridges being substantially continuous from the inside to the outside and being arranged at the two adjacent sides inside each mass chamber. The ridges are arranged in a radial direction, and they are provided to attain a mixing effect for the mass. There is the danger of zones getting formed between the disk-like bodies. In these zones, mass could be resident, and it could stay in these zones, so that the mass exclusively flows over the outer sides of the two disk-like bodies being adjacent to the tempering surfaces. A substantial mixing effect of the mass inside the mass chamber is not attained by these two disks. Temperature sensors for the mass are exclusively arranged radially outside in the mass chambers between the two disk-like bodies. Radially outside means that the temperature sensors are not located inside the mass passage which is connected to the driving shaft, but rather in the outer region of the tempering column. Although the location of the temperature sensor is arranged inside a zone, it is never arranged at the end of a zone and between two zones, respectively, so that with this arrangement it is not possible to measure the exact temperature at the end of a zone. Additionally, the measurement of the temperature in case of partial load is negatively influenced by changes of the stream and similar effects.

SUMMARY OF THE INVENTION

Briefly described, the present invention relates to an apparatus for continuously tempering chocolate masses and the like. The apparatus includes at least one tempering column including a plurality of liquid chambers. The liquid chambers include tempering surfaces, and they are interconnected for the flow of a tempering medium. A plurality of mass chambers is arranged between the tempering surfaces of the liquid chambers. The liquid chambers and the mass chambers form a cylinder. A plurality of mixing tools is provided, each mixing tool being arranged in one of the mass chambers, and each mixing tool being connected to a driving shaft. A plurality of mass passages is provided, each mass passage interconnecting two adjacent mass chambers for the flow of the mass to be tempered. Each of the mass passages has the shape of an annular gap being connected to and surrounding the driving shaft. At least one temperature sensor is arranged in one of the mass passages having the shape of an annular gap being connected to and surrounding said driving shaft.

The present invention may be applied to two adjacent mass chambers no matter if the mass chamber is part of a cooling zone or a cooling stage, a crystallization zone or a crystallization stage or a reheat zone or a reheat stage. The tempering medium may be either a cooling medium or a heating medium. Usually, water is used as tempering medium. But it is also possible to use other liquid mediums. It is not essential to the invention whether the two liquid chambers being adjacent to the mass chamber are connected to one and the same or to different tempering circuits. Anyway, it is especially advantageous to apply the invention between two adjacent mass chambers being part of different zones, and especially between the crystallization zone and the reheat zone. The mass to be tempered may be a chocolate mass or a similar mass including white chocolates, cacao-containing and fat-containing masses.

The invention is based on the idea of arranging the temperature sensor radially inside of the tempering column. Radially inside means a position of the temperature sensor in which it is located in a mass passage being arranged nearby the driving shaft and connected to the driving shaft of the tempering column. Consequently, the temperature sensor has to be designed to be longer and structurally a little more complicated than it is known from the prior art. Additionally, it is necessary to provide the mass passage with a cross section which is rather insensitive to changes of the stream at partial load of the apparatus. Such changes of the stream occur at partial load compared to the operation of the apparatus at nominal load. This requirement is better fulfilled by a mass passage having an annular cross section than by a mass passage having a circular cross section. The walls limiting the cross section are closer to one another in an annular gap than this is the case in a circular cross section.

Preferably, the mixing tool being arranged inside the first of two adjacent mass chambers through which the mass flows is designed as a disk. Preferably, the disk has openings for the passage of the mass from the bottom side of the disk to the top side of the disk only in the region of its outer circumference. The disk further includes a majority of mixing blades being arranged on its two surfaces, the mixing blades taking the mass of the tempering surfaces without directly touching or contacting the tempering surfaces. The mixing blades have the effect of thoroughly mixing the mass. By the use of only one disk, the mass chamber is subdivided into two separate subchambers. The mass flows from the lower subchamber to the upper subchamber through the openings being arranged in the region of the outer diameter of the disk. Thus, the mass flows from the bottom side of the disk to the top side of the disk through the openings of the disk. It is advantageous to arrange the mass entrance, the mass exit and all mass passages close to the center or in the center line of the apparatus. Close to the center or in the center may be also called "radially inside". Preferably, the openings for the passage of the mass are arranged radially outside at all disks. "Radially outside" means rather far away from the longitudinal center line of the apparatus. The longitudinal center line of the apparatus corresponds to the axis of the driving shaft. Nevertheless, the disks may further include holes which are not arranged radially outside. These holes should be preferably small not to have a negative effect on the flowing and the mixing of the mass. It has to be secured that the mass flows or streams in a forced way also at partial load of the apparatus. Thus, a perfect forced flow of the mass in the FIFO (first in/first out) manner is realized. The conveying effect onto the mass in the sense of the forced streaming of the mass is fulfilled by a mass pump. A plurality of mixing blades is arranged on each single disk being rotatingly driven to rotate inside each mass chamber, the disk being substantially continuous along its surface. The mixing blades are formed by a relatively great number of relatively small elements or bodies having a wall-like or blade-like design. The extension or the length of the mixing blades is substantially less than the radius of the disk. The mixing blades are arranged to be spaced apart at the top side and the bottom side of the disk, the distance between the mixing blades being relatively great. Thus, a forming of substantial channels is prevented. Instead, the mass to be tempered is moved to be intensively mixed. The conveying effect for the forced streaming of the mass through the mass chambers provided by the mixing blades is rather small. Generally, the mixing blades may be designed similar to mixing blades being arranged on stirring arms known from the prior art. Nevertheless, due to the arrangement and the combination of the mixing blades on each single disk inside each mass chamber, the overall effect of the mixing blades is different to what is known in the prior art. With the mixing blades according to the present invention, it is possible to attain a forced movement of the mass through the mass chambers, and to intensively mix the mass without attaining the disadvantages known from the prior art. Additionally to the mixing function, the mixing blades also fulfil the function of taking the mass off the tempering surfaces. The mixing blades do not have to be arranged in a radial direction and in such a way with respect to one another, as it is known from mixing arms in the prior art, but they may be arranged spaced apart over the surface of the disk at the top side and the bottom side of the disk. There is a number of advantageous ways of arranging the mixing blades. It is always desired to mix the different regions of the mass during the forced flow of the mass along the bottom side and the top side of the disk in a radial direction from the outside to the inside and from the inside to the outside, respectively. Besides the effect of taking the mass off the tempering surfaces, an essential objective of the mixing blades is to mix the mass. Nevertheless, it is not disadvantageous if the mixing blades further provide an additional conveying action, no matter if the conveying action conveys the mass in the same direction as the pump, or in the opposite direction as the pump, as long as the conveying action being provided by the pump is greater than the conveying action provided by the mixing blades. Consequently, the mass having a homogenous consistency enters the annular gap. Thus, it is possible to measure the exact and representative temperature of the mass by the temperature sensor being arranged inside the annular gap being connected to and surrounding the driving shaft of the apparatus.

The mixing blades may have a length which is less than the radius of the disk. The mixing blades are preferably arranged at the top and at the bottom side of the disk without continuous channels being formed between the mixing blades. This arrangement of the mixing blades has a positive effect on the mixing action. Consequently, the exactness of the measurement of the temperature is further improved.

The temperature sensor may extend through the tempering column in a radial direction from the outside to the inside of the tempering column. Such an arrangement implies that the design and the arrangement of the temperature sensor is a little more complicated than known. Nevertheless, known elements, for example a chamber element, or special elements, for example a separate distance disk, may be used. The distance disk may be designed to be hollow, and it is not connected to a cooling or to a heating circuit, but it may rather exclusively contain the temperature sensor. It is also possible to design the distance disk in the form of an insolating disk. In this case, the temperature of the mass upstream to the temperature sensor is no longer changed, but the mass is only mixed, and the temperature of the mass is consequently evened out. Such an arrangement makes sense, especially in case the insolating disk is located between two different tempering zones. The temperature sensor may be also arranged in a wall of a liquid chamber being connected to a circuit for a tempering medium.

Another possibility is to arrange the temperature sensor inside the driving shaft. In this embodiment, the temperature sensor extends from the driving shaft in a radial direction protruding from the driving shaft into the mass passage. For this arrangement, the driving shaft may include an actual channel or a bore. A sliding ring contact or a transmitter may be used to transmit the signals of the temperature signal. In this arrangement, the temperature sensor rotates together with the driving shaft about the axis of the driving shaft inside the annular gap.

The disks of the mixing tools may further include a plurality of first and second mixing blades being arranged at their top and bottom side. The first mixing blades are designed and arranged to move the mass outwardly in a radial direction. The second mixing blades are designed and arranged to move the mass inwardly in a radial direction. Consequently, the mass is thoroughly mixed. This effective mixing action due to two different kinds of mixing blades is attained in the region of the bottom side of the disk, as well as in the region of the top side of the disk. The arrangement of the mixing blades at the disk may be symmetric to the plane of the disk. Due to the intense mixing at all cross sections, compared to the prior art, the mass attains a comparatively constant and homogenous temperature. Thus, in case of applying the invention in a crystallization zone, it is possible to attain a sufficient initial crystallization by forming a sufficient number of nucleuses of crystal.

The mixing blades may be formed as pure blades for mixing. Thus, they do not provide a substantial conveying action. The forced movement of the mass through the mass chambers is substantially attained by the mass pump. A mass pump is always present in an apparatus for continuously tempering chocolate masses and the like.

It is an object of the present invention to provide an apparatus for continuously tempering chocolate masses and the like being capable of measuring the exact temperature of the mass to be tempered.

It is another object of the present invention to provide an apparatus for continuously tempering chocolate masses and the like being capable of exactly and representatively measuring the temperature of the mass between two zones of the apparatus.

It is another object of the present invention to provide an apparatus for continuously tempering chocolate masses and the like being capable of exactly measuring the temperature of the mass at nominal load or at nominal output.

It is another object of the present invention to provide an apparatus for continuously tempering chocolate masses and the like being capable of measuring the exact temperature of the mass to be tempered at partial load.

Still another object of the present invention is to provide an apparatus for continuously tempering chocolate masses and the like with which the mass is thoroughly mixed without channels or zones of non-moving mass occurring.

Other objects, features and advantages of the present invention will become apparent to one with skill in the art upon examination of the following drawings and the detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE DRAWINGS

Figure 1:
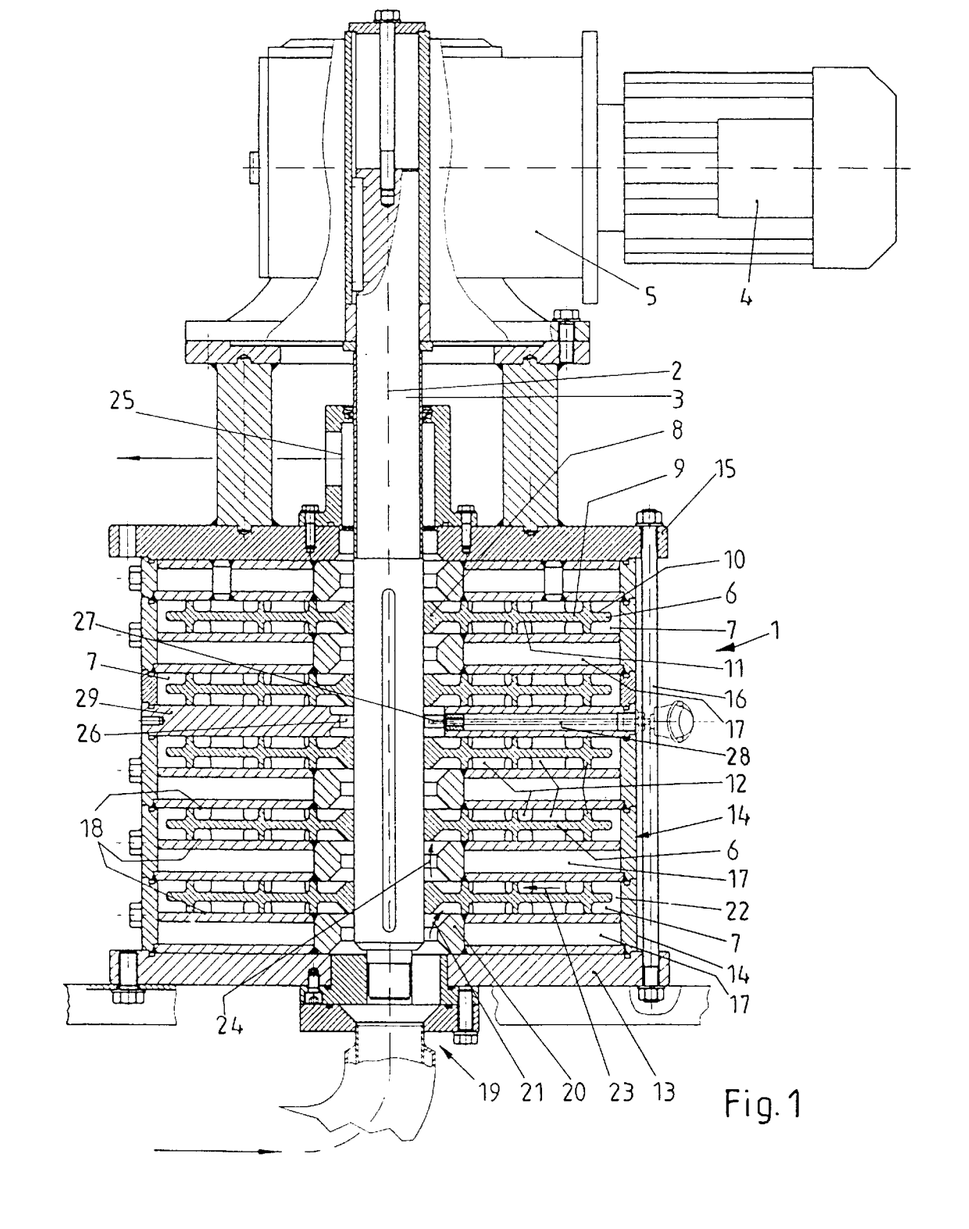
FIG. 1 illustrates a vertical sectional view through the apparatus having a first design and arrangement of the temperature sensor.

Referring now in greater detail to the drawings, FIG. 1 illustrates the basic structure of the essential elements of the apparatus for continuously tempering chocolate masses and the like. An apparatus of this type may be also called a disk tempering apparatus, since a number of disk-like elements are combined to form a tempering column 1. The mass to be tempered inside the tempering column may be chocolate, white chocolate, a cacao-containing or a fat-containing mass. The tempering column 1 includes a vertical axis 2. A driving shaft 3 extends continuously in the direction of the vertical axis 2 along a substantial portion of the height of the apparatus. The driving shaft 3 is rotatingly driven by a motor 4 and by a reducing gear 5 being arranged between the motor 4 and the driving shaft 3. Mixing tools or elements 6 include disks 9 and they are fixedly connected to the driving shaft 3 to rotate within mass chambers 7 about the axis 2 of the driving shaft 3. The mixing tools 6 have a stirring and a mixing effect on the mass to be tempered. Each disk 9 includes a hub 8 being arranged in the inner radial region of the disk 9 meaning rather close to the center point of the disk 9. The hub 8 is fixedly connected to the driving shaft 3 by a feather key connection. The hub 8 extends outwardly in a radial direction into a body of the disk 9. The disk 9 and the body of the disk 9, respectively, has a substantially flat surface, and it has a height which is less than the height of the mass chamber 7. The disk 9 is arranged approximately in the middle of the height of the mass chamber 7. The body of the disk 9 extends substantially along the entire surface, meaning it forms an annular surface. The body and the disk 9, respectively, include a top side 10 and a bottom side 11. Mixing blades 12 are arranged on both the top side 10, as well as on the bottom side 11 of the disk 9. The mixing blades 12 are spaced apart in a radial direction and in a circumferential direction across the top side 10 and the bottom side 11 of the disk 9. It can be seen from FIG. 1 that in this embodiment includes a total number of five disks 9 being fixedly connected to the driving shaft 3, and therefore being commonly driven inside the tempering column 1 of the apparatus for continuously tempering chocolate masses and the like.

The stationary portion of the apparatus and of the tempering column 1, respectively, also has a disk-like or section-like design. A plurality of rings 14 is arranged one above the other between a lower cover 13 and an upper cover 15. The rings 14 are kept in place between the two covers 13 and 15 by screws 16 being arranged about the circumference of the tempering column 1. Each ring 14 includes a liquid chamber 17 through which a tempering medium, preferably water, flows. The liquid chambers 17 being arranged one above the other are usually connected to different tempering circuits. In this way, the groups of liquid chambers 17 are formed to attain a cooling zone, a crystallization zone and a reheat zone (in the order as seen from the bottom to the top). To make the drawings easy to understand, the circuits and their connections to the liquid chamber 17 are not illustrated. Each liquid chamber 17 usually includes two tempering surfaces 18. These tempering surfaces 18 are the free surfaces of the mass chambers 7. The tempering surfaces 18 either pass heat to the flowing mass or receive heat from the flowing mass. A mass entrance 19 is arranged in the center of the lower cover 13, and it extends through the lower cover 13. The melted mass to be tempered is pumped through the tempering column 1 from the bottom to the top through the mass entrance 19 by means of a pump (not illustrated). First of all, the mass is guided through the region of the liquid chamber 17 by a bush 20 surrounding the shaft 3 with a distance. Next, the mass enters the lowermost mass chamber 7 in the direction of arrow 21. The mass flows into the portion of the mass chamber 7 being located below the disk 9 of the mixing tool 6. At this point, the mass cannot flow in an upward direction towards the top side 10 of the disk 6, but it is forced to move along the lowermost tempering surface 18 in the region between the bottom side 11 of the lowermost disk 9 and the lowermost tempering surface 18 in a radial direction from the inside to the outside. In this way, the mass is taken off the lowermost tempering surface 18 by the mixing blades 12, and the mass is thoroughly mixed and stirred. Openings 22 are arranged in the region of the outer diameter of the mixing tool 6. The mass enters the region of the top side 10 of the lowermost disk 9 through these openings 22. Thus, the mass enters the portion of the mass chamber 7 being located between the top side 10 of the lowermost disk 9 and the tempering surface 18 of the second liquid chamber 17. In this region, the mass moves according to arrow 23 substantially in a radial direction from the outer circumference to the center of the tempering column 1. During this movement, the mass is also taken off the tempering surface 18 by the mixing blades 12 being arranged at the top side 10 of the disk 9. Again, the mass is thoroughly mixed by the mixing blades 12. The mass enters the second mass chamber 7 via the second bush 20 according to arrow 24. The above described action of the movement and the mixing of the mass is repeated at the second disk 9. The mass always moves in a radial direction from the inside to the outside below the bottom side 11, and it moves in a radial direction from the circumference to the center of the tempering column 1 above the top side 10 of the disk 9. This is true for each following disk 9 and each following mass chamber 7, respectively, the mass flowing from the bottom to the top of the tempering column 1 until the mass finally exits through a central mass exit 25. Coming from the mass exit 25, the mass may for example enter a coating machine for coating articles with the mass. In this embodiment, the mass entrance 19, the bushes 20 and the mass exit 25 are arranged in the center, meaning radially inside the tempering column 1. The bushes 20 form the inner connecting points for the mass meaning mass passages 26 being located radially inside. At the same time, the openings 22 being arranged radially outside at the disk 9 allow for the mass flowing from the bottom side 11 to the top side 10 of the disk 9. Thus, the mass flows through the mass chamber 7 in a forced manner. Nests or non-moving regions of the mass are prevented. All mass elements flow or stream through the tempering column 1 in a uniform and continuous manner. This means that each mass element is guided through the tempering column 1 in approximately the same period of time. Thus, the FIFO (first in/first out) principle is realized.

It is especially desired to measure and to check the temperature of the mass as accurate and as representative as possible to control the tempering circuits with respect to the attained information. For example, it is important to measure the temperature of the mass exiting the crystallization zone and entering the reheat zone as accurate and as representative as possible. Nevertheless, it is also possible to measure the temperature of the mass at a different location, for example at the end of the cooling zone. It is essential that the temperature is measured in a mass passage 26 being located radially inside, meaning a place in which an annular mass passage 26 is arranged. Such an annular mass passage 26 does not depend from changes of the flow in case of fractional load of the apparatus compared to a mass passage having a circular surface or another design. Nevertheless, the distance between the elements limiting the annular mass passage 26 should not be chosen to be too small to make sure that the mass securely flows through the annular gap being connected to and surrounding the driving shaft 3 also in case of fractional load of the apparatus. This requirement is fulfilled by a radial inside design of the mass passages 26. Therefore, such a mass passage 26 being arranged radially inside is exclusively used to measure the temperature.

A temperature sensor 27 for measuring the temperature is arranged to extend into the annular mass passage 26 in a representative manner. The temperature sensor 27 includes supply lines 28. According to the embodiment of the apparatus illustrated in FIG. 1, the supply lines 28 are arranged to extend in a radial direction towards the driving shaft 3. A distance disk 29 is provided for the arrangement of the temperature sensor 27. The separate distance disk 29 has approximately half the height of the other elements forming the mass chambers 7 and the liquid chambers 17. It is also possible that the a mass chamber 7 adjacent to the distance disk 29 has half the height of the other elements. The distance disk 29 is not connected to any of the tempering circuits. Thus, the distance disk 29 does not serve to have an influence on the temperature of the mass, but, instead, it is provided to hold the temperature sensor 27 and its supply lines 28 exactly in their position in the annular gap of the mass passage 26. In combination with the mixing tools 6 being formed as disks 9 of two adjacent mass chambers 7, the especially positive effect of the mixing tool 6 being arranged upstream with its mixing blades 12 being arranged at its top side 10 does not change the temperature of the mass for example at the end of the crystallization zone. Instead, this mixing tool 6 exclusively fulfils an intense mixing of the mass in a radial direction from the outside to the inside of the tempering column 1. It is desired that the temperature of the mass is evened out, and that the mass approximately having an homogeneous temperature streams through the annular mass passage 26 passing the temperature sensor 27. In this way, the desired effect of measuring the temperature of the mass especially accurately, correctly and representatively for the measuring point is attained. The distance disk 29 may be made of metal. It is located between two mass chambers 7. In both mass chambers 7 adjacent to the distance disk 29, the mass is thoroughly mixed without a substantial temperature change. Under steady conditions, the distance disk 29 made of metal will have approximately the same temperature as the mass flowing through the mass passage 26. Thus, this design has another positive effect on the measuring of the temperature.

Figure 2:
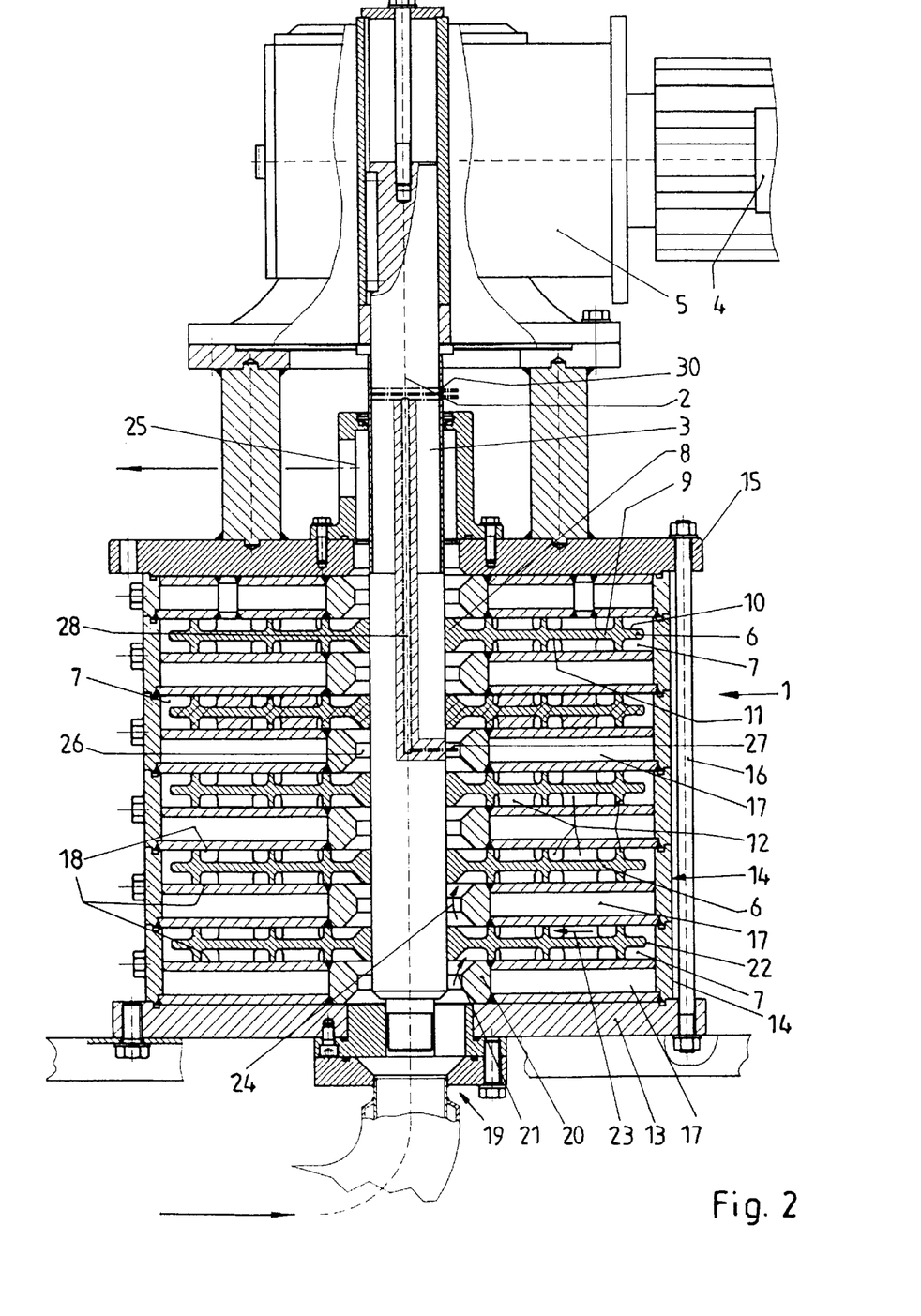
FIG. 2 illustrates a vertical sectional view through the apparatus having a second design and arrangement of the temperature sensor.

As illustrated in FIG. 2, in a second embodiment of the apparatus for continuously tempering chocolate masses and the like, the temperature sensor 27 with its supply lines 28 does not extend in a radial direction from the outside to the inside of the tempering column 1, but instead in a radial direction from the inside to the outside of the tempering column 1. For this reason, the supply lines 28 are located inside the driving shaft 3. Thus, the special effect of the temperature sensor 27 during use of the apparatus rotating inside the annular mass passage 26 is attained, so that the temperature sensor 27 moves about the axis 2 of the driving shaft 3 and along the circumference of the mass passage 26. Slip ring contacts 30 allow for transmitting the signals to the outside and to a control device (not shown), respectively. Instead of a slip ring contact, it is also possible to use a wireless transmitting device sending and receiving the signals being representative for the temperature by a transmitter and a receiver.

On the one hand, the embodiment of the apparatus illustrated in FIG. 2 is a little more complicated with respect to the arrangement of the temperature sensor 27 with its supply lines 28 inside the driving shaft 3. On the other hand, this embodiment has the advantage that all usual elements forming a mass chamber 7 or a liquid chamber 17 remain unchanged. The temperature is not measured exactly between two zones of different temperatures, since the liquid chamber 17 building or containing the mass passage 26 may exclusively be connected to one cooling or tempering circuit, so that the mass is treated upstream and downstream of the location of the temperature sensor 27 the same way with respect to the temperature. In case the liquid chamber 17 is part of a crystallization zone, and it is connected to a corresponding cooling circuit, in this embodiment as illustrated in FIG. 2, the temperature of the mass is not measured at the end of the crystallization zone, meaning the entrance of the reheat zone, but upstream instead. Nevertheless, the above described arrangement may be representative for the actual temperature of the mass in the region between the crystallization zone and the reheat zone.

Figure 3:
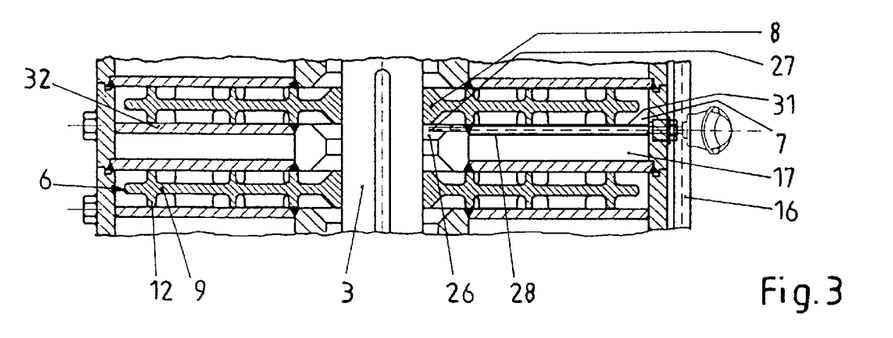
FIG. 3 illustrates a third design and arrangement of the temperature sensor.

As illustrated in FIG. 3, the embodiment of the apparatus having a third design and arrangement of the temperature sensor 27, has similar advantages and disadvantages as the embodiment of FIG. 2. The supply lines 28 of the temperature sensor 27 again extending into the mass passage 26 radially inside are arranged in a channel 31 being located in one of the two walls 32 of the liquid chamber 17. The temperature sensor 27 again extends in a radial direction from the outside to the inside, and it is stationary. The temperature sensor 27 either ends at the narrowest place of the mass passage 26 or, as illustrated in FIG. 3, at a place in which the cross section of the passage is comparatively greater.

Figure 4:
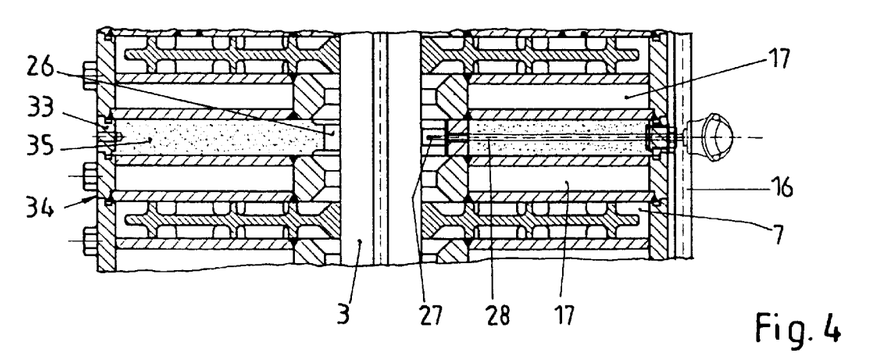
FIG. 4 illustrates a fourth design and arrangement of the temperature sensor.

FIG. 4 illustrates another embodiment of the apparatus. The apparatus includes a separate hollow disk 33 which is part of the modular construction of the apparatus. A compensation module 34 having approximately half the height of the other modules or elements forms a liquid chamber 17 being connected to a tempering conduit similar to the liquid chamber 17 of the element being arranged upstream. The hollow disk 33 serves to contain the temperature sensor 27 inside the mass passage 26 without temperature influences, as well as to arrange the supply lines 28 of the temperature sensor 27 in a radial direction from the outside to the inside. The hollow disk 33 may be filled with an insolating material 35, or it may be designed as an insolating disk to separate two tempering conduits. It is important that the hollow disk 33 and the temperature sensor 27, respectively, is arranged between two adjacent liquid chambers 17 meaning a place being especially representative to measure the temperature.

Figure 5:
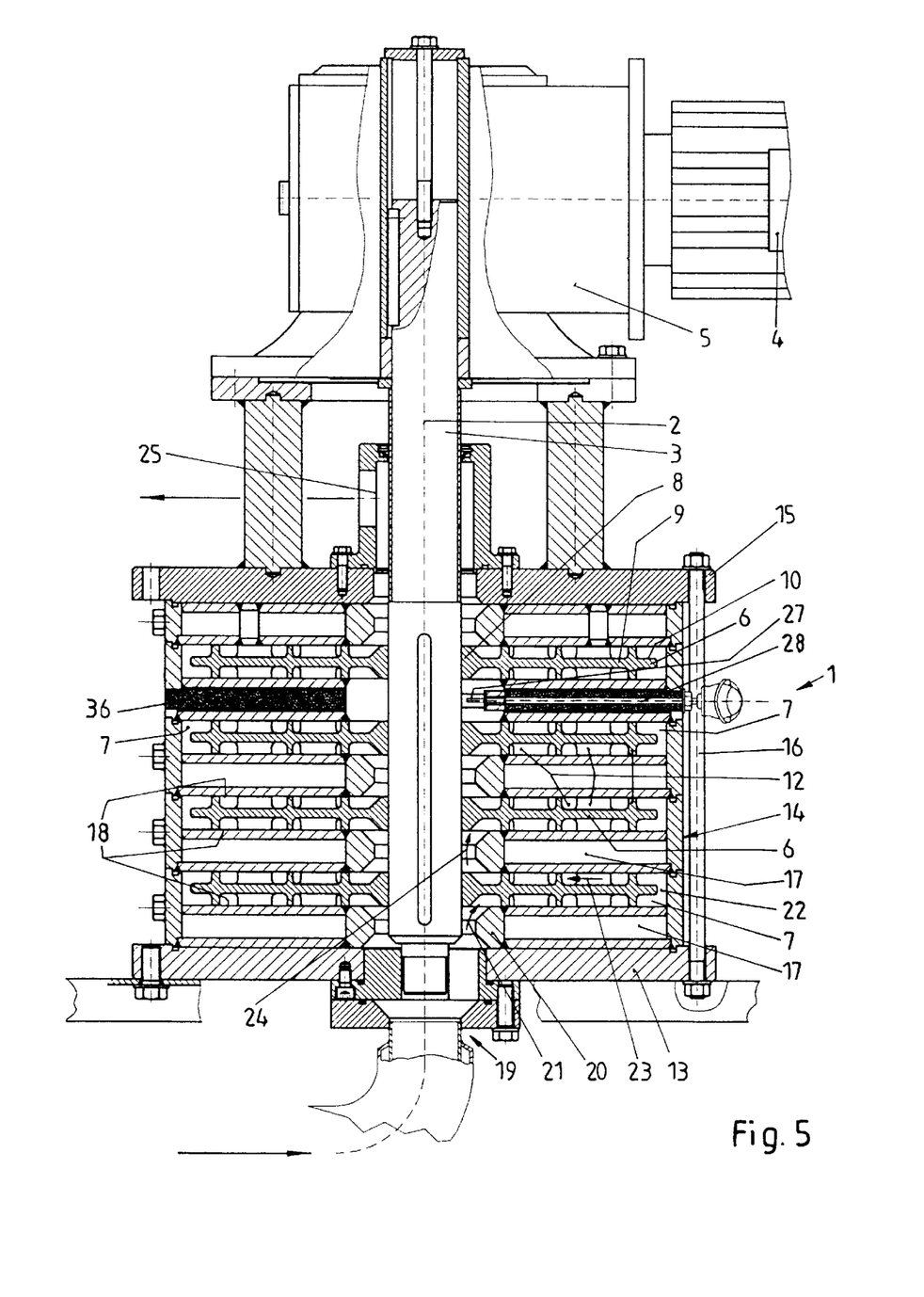
FIG. 5 illustrates another design and arrangement of the temperature sensor.

FIG. 5 illustrates another embodiment of the apparatus. FIG. 5 illustrates the essential elements of the entire apparatus. The temperature sensor 27 with its supply lines 28 extends in a radial direction from the outside to the inside of the tempering column 1. The temperature sensor 27 is located inside an insolating disk 36. The insolating disk 36 may be the liquid chamber 17 of a usual element of the tempering column 1 not being connected to a tempering circuit, but instead being filled with an insolating material 35 or consisting of such an insolating material. The temperature sensor 27 on both sides is surrounded by mass chambers 7. Thus, the temperature sensor 27 is arranged between two adjacent mass chambers 7, although the temperature of the mass is not changed in the region of the temperature sensor 27. Thus, the apparatus provides the advantages already being described with respect to the embodiment according to FIG. 1. Again, the mass is exclusively mixed (and the temperature is not substantially changed) upstream and downstream of the temperature sensor 27. Thus, a homogeneous temperature of the mass is attained.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for continuously tempering chocolate masses and the like, comprising:
    at least one tempering column including a plurality of liquid chambers including tempering surfaces and being interconnected for the flow of a tempering medium;
    a plurality of mass chambers, each of said mass chambers being arranged between said tempering surfaces of said liquid chambers;
    said liquid chambers and said mass chambers forming a cylinder;
    a plurality of mixing tools each being arranged in one of said mass chambers and each being connected to a driving shaft;
    a plurality of mass passages interconnecting two adjacent mass chambers for the flow of the mass to be tempered, each of said mass passages having the shape of an annular gap being connected to and surrounding said driving shaft; and
    at least one temperature sensor being arranged in one of said mass passages having the shape of an annular gap being connected to and surrounding said driving shaft.

2. The apparatus of claim 1, wherein said mixing tools include disks having an outer diameter, a top side and a bottom side, and including openings in the region of their outer diameter allowing for a passage of the mass from said bottom side to said top side of said disks.

3. The apparatus of claim 2, wherein said disks further include a majority of mixing blades being arranged at their top and bottom side, said mixing blades being designed and arranged to take the mass off said tempering surfaces and to mix the mass without getting in direct contact with said tempering surfaces.

4. The apparatus of claim 3, wherein said mixing blades have a length which is less than the radius of said disk, and they are arranged at said top and bottom side of said disk without continuous channels being formed between said mixing blades.

5. The apparatus of claim 2, wherein said disks further include a plurality of first and second mixing blades being arranged at their top and bottom side, said first mixing blades being designed and arranged to move the mass radially in an outward direction, and said second mixing blades being designed and arranged to move the mass radially in an inward direction to mix the mass.

6. The apparatus of claim 5, wherein said first and second mixing blades are designed as mixing blades not providing a substantial conveying motion for the mass.

7. The apparatus of claim 1, wherein said temperature sensor extends through said tempering column in a radial direction from the outside to the inside of said tempering column.

8. The apparatus of claim 7, wherein said temperature sensor is arranged in a wall of one of said liquid chambers.

9. The apparatus of claim 1, further comprising a separate distance disk inside which said temperature sensor is arranged.

10. The apparatus of claim 9, wherein said distance disk is designed as an insulating disk.

11. The apparatus of claim 1, wherein said temperature sensor is arranged inside said driving shaft, and it extends through said driving shaft in a radial direction.

12. An apparatus for continuously tempering chocolate masses and the like, comprising:
    a tempering column including a plurality of liquid chambers including tempering surfaces and being interconnected for the flow of a tempering medium;
    a plurality of mass chambers, each of said mass chambers being arranged between said tempering surfaces of said liquid chambers;
    said liquid chambers and said mass chambers forming a cylinder;
    a plurality of mixing tools each being arranged in one of said mass chambers and each being connected to a driving shaft, said mixing tools including disks having an outer diameter, a top side and a bottom side, said disks including openings being arranged in the region of their outer diameter allowing for a passage of the mass from said bottom side to said top side of said disks, said disks including a majority of mixing blades being arranged at their top and bottom side, said mixing blades having a length which is less than the radius of said disk and being designed and arranged to take the mass off said tempering surfaces and to mix the mass without getting in direct contact with said tempering surfaces;
    a plurality of mass passages interconnecting two adjacent mass chambers for the flow of the mass to be tempered, each of said mass passages having the shape of an annular gap being connected to and surrounding said driving shaft; and
    at least one temperature sensor being arranged in one of said mass passages having the shape of an annular gap being connected to and surrounding said driving shaft, said temperature sensor extending through said tempering column in a radial direction from the outside to the inside of said tempering column.

13. The apparatus of claim 12, further comprising a separate distance disk inside which said temperature sensor is arranged.

14. The apparatus of claim 13, wherein said distance disk is designed as an insulating disk.

15. The apparatus of claim 12, wherein said temperature sensor is arranged in a wall of one of said liquid chambers.

16. The apparatus of claim 12, wherein said disks further include a plurality of first and second mixing blades being arranged at their top and bottom side, said first mixing blades being designed and arranged to move the mass radially in an outward direction, and said second mixing blades being designed and arranged to move the mass radially in an inward direction to mix the mass.

17. The apparatus of claim 16, wherein said first and second mixing blades are designed as mixing blades not providing a substantial conveying motion for the mass.

\* \* \* \* \*